United States Patent [19]
Lazzerini et al.

[11] 4,137,220
[45] Jan. 30, 1979

[54] PREPARATION OF NOVOLAK EPOXY RESINS

[75] Inventors: Giorgio Lazzerini, Milan; Silvio Vargiu, Casatenovo (Como); Mario Pitzalis, Arcore (Milan), all of Italy

[73] Assignee: Societa' Italiana Resine S.I.R. S.p.A., Milan, Italy

[21] Appl. No.: 747,856

[22] Filed: Dec. 6, 1976

[30] Foreign Application Priority Data

Dec. 19, 1975 [IT] Italy ................................ 30493 A/75

[51] Int. Cl.$^2$ ............................................. C08G 59/08
[52] U.S. Cl. ...................................... 528/135; 526/68; 528/147; 528/153
[58] Field of Search .................................... 260/59 EP

[56] References Cited
U.S. PATENT DOCUMENTS

| | | | |
|---|---|---|---|
| 2,801,227 | 7/1957 | Goppel | 260/59 EP X |
| 2,829,124 | 4/1958 | Napravnik et al. | 260/60 |
| 2,840,541 | 6/1958 | Pezzaglia | 260/47 |
| 3,252,850 | 5/1966 | Partansky | 161/185 |
| 3,860,561 | 1/1975 | Vargiu et al. | 260/59 EP |
| 3,867,346 | 2/1975 | Vargiu et al. | 260/59 EP |

OTHER PUBLICATIONS

Lee & Neville, Handbook of Epoxy Resins, McGraw-Hill, New York, 1967, pp. 2-10.

Primary Examiner—Harold D. Anderson
Assistant Examiner—E. A. Nielsen
Attorney, Agent, or Firm—Sughrue, Rothwell, Mion, Zinn and Macpeak

[57] ABSTRACT

A Novolak epoxy resin is prepared by adding an aqueous solution of alkali metal hydroxide to a solution of Novolak phenolic resin in epichlorohydrin, distilling off water during said addition in the form of an azeotrope with epichlorohydrin and recycling the latter, while maintaining the reaction medium at 60–80° C and at a pH between 7 and 8 and a water content of from 0.5 to 2.5 wt.% in said medium.

The thermosetting resin thus obtained can be used in applications requiring resins with low chlorine contents, low viscosity and high epoxy value.

10 Claims, No Drawings

PREPARATION OF NOVOLAK EPOXY RESINS

The present invention relates to a method for the preparation of Novolak epoxy resins having a high epoxy value, low viscosity and low hydrolizable chlorine content.

Novolak epoxy resins may be prepared by reacting a Novolak phenolic resin:

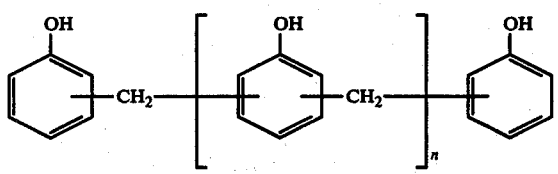

where n varies from 0 to about 5, with an epoxidizing agent, preferably epichlorohydrin, in the presence of an acceptor of hydrohalic acid.

These Novolak epoxy resins can be transformed into compounds having a higher molecular weight by reaction with hardening agents, reactive with the epoxy groups, such as amine compounds, anhydrides of carboxylic acids and polyamides.

The Novolak epoxy resins obtained from the Novolak phenolic resins (I) with n>0, possess in relation to conventional bisphenol epoxy resins, a higher epoxy value, where by "epoxy value" is meant the number of epoxide groups per mole of resin.

The epoxy resins obtained from 2,2-bis(4-hydroxyphenyl)propane (bisphenol A) and epichlorohydrin can at best have an epoxy value equal to 2. The greater epoxy value of the Novolak epoxy resins permits the obtaining of hardened resins having a greater degree of cross-linking, and thus a greater chemical and thermal resistance.

In general, Novolak epoxy resins have, compared with the traditional epichlorohydrin-bisphenol resins, disadvantages due to their excessively high viscosity.

Moreover, regardless of the number of hydroxy groups of the said Novolak phenolic resin, it is not possible to transform all the phenolic hydroxyl groups into epoxide groups, when using known methods.

The conventional Novolak epoxy resins contain an excessively high amount of hydrolizable chlorine, with a resulting short "pot-life" of these resins when the latter are hardened with amines.

These drawbacks are avoided by means of the method of the present invention, which affords the preparation of Novolak epoxy resins from Novolak phenolic resins (I) and from epichlorohydrin, having low viscosity and hydrolyzable chlorine content and a high epoxy value.

Thus, the invention provides a process for the preparation of a Novolak epoxy resin, characterized by (a) gradually feeding an aqueous solution of alkali metal hydroxide into a solution in epichlorohydrin of a Novolak phenolic resin definable by the general formula:

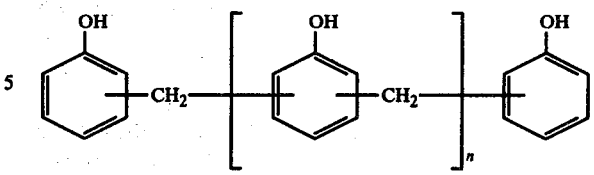

where the average value of n is from 0 to 5, the ratio between the moles of epichlorohydrin and the number of phenolic hydroxyl groups in said epichlorohydrin solution being from 2.5:1 to 12:1, until the number of moles of alkali metal hydroxide fed in is substantially equivalent to the number of phenolic hydroxyl groups present in said epichlorohydrin solution, while maintaining the reaction medium at boiling point and at a temperature of from 60° to 80° C., distilling off water in the form of an azeotropic mixture with epichlorohydrin and recycling the distilled epichlorohydrin into the reaction medium, the addition of alkali metal hydroxide and the distillation conditions being adjusted so as to maintain in the reaction medium a water content of from 0.5 to 2.5 wt.% and a pH value between 7 and 8;

(b) distilling off the residual water present in the reaction medium and recovering the Novolak epoxy resin from the reaction products.

The Novolak phenolic resins used in the process of the present invention are those defined by the general formula (I), where n is from 0 to 1.0 when Novolak epoxy resins, which are liquid or semi-liquid at atmospheric temperature, are prepared and where n is higher than 1.0 and up to 5 in the preparation of solid Novolak epoxy resins.

As is known these Novolak phenolic resins are obtained in the art by condensing phenol and formaldehyde in a phenol/formaldehyde molar ratio higher than 1:1 and in the presence of an acid catalyst.

According to the present invention, the ratio of the number of moles of epichlorohydrin to the number of phenolic hydroxyl groups in the epichlorohydrin solution is kept at a value of from 2.5:1 to 12:1.

When this ratio is lower than 2.5:1, the resulting Novolak epoxy resin has undesired values of the epoxy equivalent and viscosity, whilst values greater than 12:1 afford no appreciable improvements. Best results are obtained by maintaining said ratio at a value of from 6:1 to 8:1.

It is also essential, for the purposes of the present invention, to add the alkali metal hydroxide in a molar amount substantially equivalent to the amount of phenolic hydroxyl groups in the epichlorohydrin solution, thereby to avoid those secondary reactions, due to the action of the alkaline hydroxide on the epichlorohydrin, which lead to the formation of undesirable by-products.

It should be noted that, in the art, it is usual instead to use an excess of alkali metal hydroxide with respect to the equivalent value (typically 10–20% in excess) with the aim of reducing the hydrolyzable chlorine content of the Novolak epoxy resin.

Preferably, a concentrated aqueous solution of alkali metal hydroxide is used, for example a solution containing from 30 to 50% by weight of alkali metal hydroxide, and the hydroxide is preferably sodium or potassium hydroxide.

The reaction temperature, the water content of the reaction medium, and the pH of said medium are critical.

In particular, the reaction temperature is kept at from 60° to 80° C., and the corresponding pressure needed to keep the mass boiling is usually from 100 to 250 mm Hg.

The water is distilled continually in the form of an azeotropic mixture with epichlorohydrin. The vapours obtained are condensed and the aqueous layer of the condensate is discharged, while the organic layer is continually recycled to the reaction medium.

The water content of the reaction medium is maintained at a value of from 0.2 to 2.5% by weight, and preferably of the order of 1% by weight.

Optimum values of the pH are around 7.5.

The feed rate of the aqueous solution of alkali metal hydroxide is both commensurate with the rate of removal of water from the reaction medium, thereby to maintain the required amount of water in the medium, and also with the rate of epoxidation of the Novolak phenolic resin, thereby to maintain the amount of free alkali metal hydroxide in the reaction medium, and hence the pH, at the desired level.

Only by operating under the conditions described, is it possible to obtain Novolak epoxy resins having an epoxy equivalent value practically equal to the theoretical value, a low viscosity and an extremely low hydrolizable chlorine content.

It has been found that higher pH values, and hence greater contents of free alkali metal hydroxide in the reaction medium, bring about undesirable effects similar to those encountered in those known methods in which an excess of alkali metal hydroxide with respect to the equivalent value is used.

Moreover, when operating at temperatures higher than 80° C., the resulting phenolic epoxy resins have excessively high values of molecular weight and viscosity.

Finally the water content of the reaction medium is important. It has been found in fact that the use of water contents beyond the indicated range leads to an increase in viscosity and in chlorine content of the epoxy resin, while the epoxy equivalent is shifted away from the theoretical value.

Upon completion of the addition of alkali metal hydroxide, it is convenient to maintain the reaction medium at the same temperature and pressure for a period of from 10 to 20 minutes. In this stage of the reaction the residual water is almost completely removed from the reaction medium.

The Novolak epoxy resin is finally recovered from the reaction products by means of known techniques.

Thus, for example in the case of liquid Novolak epoxy resins, the reaction products may be treated with water so as to wash out the alkali metal chloride. After removal of the aqueous phase, the unreacted epichlorohydrin is distilled off at subatmospheric pressure, and it is generally convenient to filter off the distillation residue so as to remove any inorganic compound present. Filters suitable for this purpose are horizontal or vertical grid type filters, with disc bases of porous organic fibres, operating with or without filtration aids.

In the case of solid Novolak epoxy resins it is convenient to carry out the filtration with the resin dissolved in a suitable solvent. The solvent is then removed by distillation.

In both cases, the Novolac epoxy resins obtained have an epoxy equivalent value equal, or very close, to the theoretical value.

These resins are very pure and their hydrolyzable chlorine content is extremely low; thus, for example in the case of liquid phenolic epoxy resins the hydrolyzable chlorine content does not exceed 0.2% by weight.

EXAMPLE 1

One uses a reaction vessel (distillation flask) having a mechanical agitator, an electric heater, a distillation column, a condenser, a separation flask for the water-epichlorohydrin distillate with a syphon for recycling into the reaction vessel the heavy epichlorohydrin phase, and a pressure regulation system.

3,400 grams of epichlorohydrin and 500 grams of a Novolak resin of general formula (I) where n is about zero, are fed into the reaction vessel.

The molar ratio between epichlorohydrin and Novolak resin is thus about 14.7:2, and the ratio between the number of moles of epichlorohydrin and the number of phenolic hydroxyl groups is approximately 7.3:1.

The pressure in the apparatus is brought to 160 mmHg, and the mass is gradually heated to boiling.

400 grams of 50% by weight aqueous solution of sodium hydroxide are then gradually added over a period of 5.5 hours. Upon completion of this addition, the ratio of the number of moles of hydroxide to the number of phenolic hydroxyl groups is equal to 1:1.

During the addition of the aqueous solution of sodium hydroxide the operating temperature is 70° C., and the water is removed from the reacting mass in the form of an azeotropic mixture with epichlorohydrin, the vapour being condensed and the liquid epichlorohydrin recycled.

Under these conditions, the average amount of water present in the reaction medium is of the order of 1% by weight, and the pH is about 7.5.

When the sodium hydroxide has been added, the mass is boiled for a further 15 minutes.

The pressure in the apparatus is brought to atmospheric pressure and the temperature of the mass to 80° C.

560 grams of water are added gradually to the agitated mass and then the organic layer is separated from the aqueous layer.

The unreacted epichlorohydrin is removed from the organic phase, operating at subatmospheric pressure. The distillation residue is filtered in order to separate the last traces of inorganic compounds present, using diatomaceous earth as filter aid.

Thus, 605 grams of a Novolak epoxy resin are obtained, having the following properties:

Gardner viscosity at 25° C. : $Z_5$
viscosity (in cps) : 10,800
epoxy equivalent : 167
volatile substances (wt.%) : 1.0
Gardner color : 2
"pot-life" at 25° C. (in minutes) : 60
hydrolyzable chlorine (wt.%) : 0.17

EXAMPLE 2

Operating according to the procedure of Example I, 3,400 grams of epichlorohydrin and 500 grams of a Novolak resin of general formula (I) where n is about 0.2, are fed into the distillation flask.

The molar ratio of the epichlorohydrin to the Novolak resin is thus about 16:1, and the ratio between the moles of epichlorohydrin and the number of phenolic hydroxyl groups about 7.4:1.

The pressure in the apparatus is brought to 160 mmHg, and the mass is heated to 70° C.

396 grams of a 50 wt.% aqueous solution of sodium hydroxide are then gradually added in 5 hours.

During the addition, the reaction temperature is about 70° C., and the water is removed in the form of an azeotropic mixture with epichlorohydrin, the vapor being condensed and the liquid epichlorohydrin recycled.

Under these conditions, the average amount of water present in the reaction medium of the order of 1% by weight, and the pH is about 7.5.

The procedure is then the same as in Example 1 and 600 grams of a Novolak epoxy resin are recovered having the following properties:

Gardner viscosity (as measured at 25° C. in 90% butylcarbitol solution) : $Y+\frac{1}{2}$
viscosity in cps (as measured at 25° C. in 90% butylcarbitol solution) : 2,080
epoxy equivalent : 167
volatile substances (wt.%) : 1.0
Gardner color : 1
"pot-life" at 25° C. (in minutes) : 45
hydrolyzable chlorine (wt.%) : 0.1

EXAMPLE 3

Operating according to the procedure of Example 1 3,285 grams of epichlorohydrin and 500 grams of a Novolak resin corresponding to the general formula (I) with n equal to about 1, are fed into the distillation flask.

The molar ratio of the epichlorohydrin to the Novolak resin is thus about 21.7:1, and the ratio between the moles of epichlorohydrin and the number of phenolic hydroxyl groups is 7.2:1.

The pressure in the apparatus is brought to 160 mmHg, and the mass heated to 70° C.

390 grams of a 50% by weight aqueous solution of sodium hydroxide are then added gradually in 5 hours.

After this addition, the ratio of the number of moles of sodium hydroxide to the number of phenolic hydroxyl groups is 1:1.

During the addition of the aqueous sodium hydroxide, the reaction temperature is about 70° C., and the water is removed in the form of an azeotropic mixture with epichlorohydrin, the vapour being condensed and the liquid epichlorohydrin phase recycled.

Under these conditions, the average amount of water present in the reaction medium is of the order of 1% by weight, and the pH is about 7.5.

Upon completion of the sodium hydroxide addition, the reagent mass is boiled for a further 15 minutes, the pressure being then brought to atmospheric and the temperature to 80°-85° C.

500 grams of water are gradually added to the agitated mass, the aqueous layer is separated from the organic layer and the latter is distilled at subatmospheric pressure, in order to remove the unreacted epichlorohydrin.

The distillation residue is filtered, using diatomaceous earth as filter aid.

Thus, 610 grams of a Novolak epoxy resin are obtained having the following properties:

Gardner viscosity (as measured at 25° C. in 85% by weight solution in methyl ethyl ketone) : V
viscosity at 50° C. in cps : 39,400
epoxy equivalent : 168
volatile substances (wt.%) : 1.0
Gardner color : 1
"pot-life" at 25° C. in minutes : 15
hydrolyzable chlorine (wt.%) : 0.2

EXAMPLE 4 (comparison)

Operating according to the procedure of Example 1, 3,400 grams of epichlorohydrin and 500 grams of a Novolak resin corresponding to the general formula (I) with n about 0.2, are fed into the distillation flask.

The molar ratio of the epichlorohydrin to the Novolak resin is thus about 16.2:1, and the ratio between the moles of epichlorohydrin and the number of phenolic hydroxyl groups is about 7.4:1.

The reaction medium is heated to boiling point at atmospheric pressure, and 396 grams of a 50% by weight aqueous solution of sodium hydroxide are added gradually to the mass in 3 hours.

Under these conditions, the reaction temperature drops from an initial value of 105° C. to a final value of 95° C., and 170–180 grams of epichlorohydrin are distilled, the distilled epichlorohydrin being recycled into the reaction medium.

Moreover, during the addition of the aqueous sodium hydroxide, the average amount of water present in the reaction medium is about 5% by weight, and the pH is very basic (about 14).

The procedure is then the same as in Example 3 and 580 grams of a Novolak epoxy resin are obtained, having the following properties:

Gardner viscosity (as measured at 25° C. in 90% butylcarbitol solution) : $Z_1$
viscosity at 50° C. in cps : 2,100
epoxy equivalent : 190
volatile substances (wt.%) : 1.0
Gardner color : 4
"pot-life" at 25° C. in minutes : 26
hydrolyzable chlorine (wt.%) : 2

EXAMPLE 5

Operating according to the procedure of Example 1, 2,850 grams of epichlorohydrin and 500 grams of a Novolak resin corresponding to the general formula (1) with n equal to about 3, are fed into the distillation flask.

The molar ratio of the epichlorohydrin to the Novolak resin is thus about 32:1, and the ratio between the moles of epichlorohydrin and the number of phenolic hydroxyl groups is about 6.4:1.

The pressure in the apparatus is brought to 200 mmHg and the mass heated to boiling point.

352 grams of a 50% by weight aqueous solution of sodium hydroxide are gradually added to the reacting mass over 5 hours.

During the addition of the aqueous sodium hydroxide, the reaction temperature is about 75° C., the water being removed in the form of an azeotropic mixture with epichlorohydrin. The vapour is condensed and the liquid epichlorohydrin recycled. Under these conditions, the average amount of water present in the reaction medium is of the order of 1% by weight and the pH is about 7.5.

Upon completion of the addition of sodium hydroxide, the mass is boiled for a further 15 minutes, and then 200 grams of water are added gradually.

The aqueous layer is separated from the organic layer which is then distilled at subatmospheric pressure to remove the unreacted epichlorohydrin.

800 grams of methyl ethyl ketone are added to the distillation residue, and the solution thus obtained is filtered to remove the inorganic compounds present, using diatomaceous earth as filter aid.

The methyl ethyl ketone is then distilled off and 600 grams of a Novolak epoxy resin are recovered, having the following properties:
melting point in ° C. (capillary) : 51-56
epoxy equivalent : 192
volatile substances (wt.%) : 0.9
Gardner color : 2
hydrolyzable chlorine (wt.%) : 0.8

It should be noted that in the Examples the "pot-life" is determined on a mixture of 90 parts by weight of Novolak epoxy resin and 10 parts by weight of triethylenetetramine.

The hydrolyzable chlorine content is measured according to the method ASTM D 1726/72 T.

The epoxy equivalent is measured according to the method ASTM D 1652/62 T.

What we claim is:

1. A method for the preparation of a Novolak epoxy resin, which comprises:
    (a) gradually feeding an aqueous solution of alkali metal hydroxide into a solution in epichlorohydrin of a Novolak phenolic resin definable by the general formula:

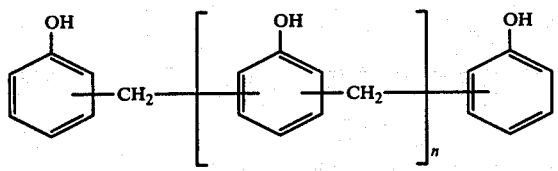

where the average value of n is from 0 to 5, the ratio between the moles of epichlorohydrin and the number of phenolic hydroxyl groups in said epychlorohydrin solution being from 2.5:1 to 12:1, until the number of moles of alkali metal hydroxide fed in is substantially equivalent to the number of phenolic hydroxyl groups present in said epichlorohydrin solution, while maintaining the reaction medium at boiling point and at a temperature of from 60° to 80° C., distilling off water in the form of an azeotropic mixture with epichlorohydrin and recycling the distilled epichlorohydrin into the reaction medium, the addition of alkali metal hydroxide and the distillation conditions being adjusted so as to maintain in the reaction medium a water content of on the order of from 1 to 2.5 wt.% and a pH value between 7 and 8;
    (b) distilling off the residual water present in the reaction medium and recovering the Novolak epoxy resin from the reaction products.

2. The method of claim 1, wherein said ratio between the moles of epichlorohydrin and the number of phenolic hydroxyl groups is from 6:1 to 8:1.

3. The method of claim 1, wherein said alkali metal hydroxide is selected from the group consisting of sodium and potassium hydroxide.

4. The method of claim 1, wherein said aqueous solution contains from 30 to 50 wt.% of alkali metal hydroxide.

5. The method of claim 1, wherein the distillation pressure is from 100 to 250 mm Hg.

6. The method of claim 1, wherein said water content is maintained at a value of about 1 wt.% and said pH at a value of about 7.5.

7. The method of claim 1, wherein said residual water is distilled off at a temperature of from 60° to 80° C., at a pressure of from 100 to 250 mm Hg and for a period of from 10 to 20 minutes.

8. The method of claim 1, wherein n is from 0 to 1.0 and said Novolak epoxy resin is liquid or semi-solid.

9. The method of claim 1, wherein n is higher than 1.0 and up to 5 and said Novolak epoxy resin is solid.

10. The method of claim 1, wherein said Novolak epoxy resin has an epoxy equivalent value substantially equal to the theoretical value.